United States Patent
Faruque et al.

(10) Patent No.: US 12,365,274 B2
(45) Date of Patent: Jul. 22, 2025

(54) VEHICLE SEAT ASSEMBLY

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 275 days.

(21) Appl. No.: 17/717,285

(22) Filed: Apr. 11, 2022

(65) Prior Publication Data

US 2023/0322133 A1    Oct. 12, 2023

(51) Int. Cl.
| | | |
|---|---|---|
| *B60N 2/427* | (2006.01) | |
| *B60N 2/235* | (2006.01) | |
| *B60R 21/00* | (2006.01) | |
| *B60R 21/01* | (2006.01) | |
| *B60R 21/015* | (2006.01) | |
| *B60R 21/207* | (2006.01) | |

(52) U.S. Cl.
CPC ......... *B60N 2/4279* (2013.01); *B60N 2/2354* (2013.01); *B60N 2/42745* (2013.01); *B60R 21/01554* (2014.10); *B60R 21/207* (2013.01); *B60R 2021/0032* (2013.01); *B60R 2021/01013* (2013.01)

(58) Field of Classification Search
CPC ........................ B60N 2/4279; B60N 2/42745
See application file for complete search history.

(56) References Cited

U.S. PATENT DOCUMENTS

| | | | | |
|---|---|---|---|---|
| 6,296,306 | B1* | 10/2001 | Specht | B60N 2/809 |
| | | | | 297/216.13 |
| 7,703,852 | B2* | 4/2010 | Wahls | B60N 2/236 |
| | | | | 297/367 R |
| 7,866,696 | B2 | 1/2011 | Wang et al. | |
| 10,974,627 | B2 | 4/2021 | Rosenberg | |
| 2002/0147535 | A1* | 10/2002 | Nikolov | B60N 2/4214 |
| | | | | 340/425.5 |
| 2005/0131606 | A1* | 6/2005 | Motozawa | B60N 2/42763 |
| | | | | 701/45 |
| 2006/0138797 | A1* | 6/2006 | Wang | B60N 2/0276 |
| | | | | 296/68.1 |

(Continued)

FOREIGN PATENT DOCUMENTS

| | | |
|---|---|---|
| KR | 20000013506 U | 7/2000 |
| WO | 2021028302 A1 | 2/2021 |

*Primary Examiner* — David R Dunn
*Assistant Examiner* — Tania Abraham
(74) *Attorney, Agent, or Firm* — Frank A. MacKenzie; Brooks Kushman P.C.

(57) ABSTRACT

An assembly includes a seat bottom. The assembly includes a seatback supported by and movable relative to the seat bottom between an upright position and a reclined position. The assembly includes an actuator supported by the seat bottom and operatively coupled to the seatback to move the seatback from the reclined position to the upright position. The assembly includes a computer having a processor and a memory storing instructions executable by the processor to command the actuator to move the seatback to the upright position in response to detecting a pending vehicle impact.

20 Claims, 9 Drawing Sheets

(56) References Cited

U.S. PATENT DOCUMENTS

| | | | |
|---|---|---|---|
| 2010/0201174 A1* | 8/2010 | Ito | B60N 2/02246 297/362 |
| 2016/0129879 A1* | 5/2016 | Harda | B60R 22/46 297/216.13 |
| 2021/0261021 A1 | 8/2021 | Kral et al. | |

* cited by examiner

VEHICLE SEAT ASSEMBLY

BACKGROUND

Vehicles typically include one or more seats. The seat includes a seatback and a seat bottom not numbered. The seatback may be supported by the seat bottom and may be stationary or movable relative to the seat bottom. The seatback and the seat bottom may be adjustable. Specifically, the seatback may be rotatable relative to the seat bottom and about a seat-lateral axis. In other words, the seatback may be movable relative to the seat bottom to support an occupant of the seat at various amounts of recline. The seat may include a seat recline mechanism configured to selectively permit and inhibit movement of the seat back relative to the seat bottom, e.g., upon actuation by the occupant.

DETAILED DESCRIPTION

Figure 1:
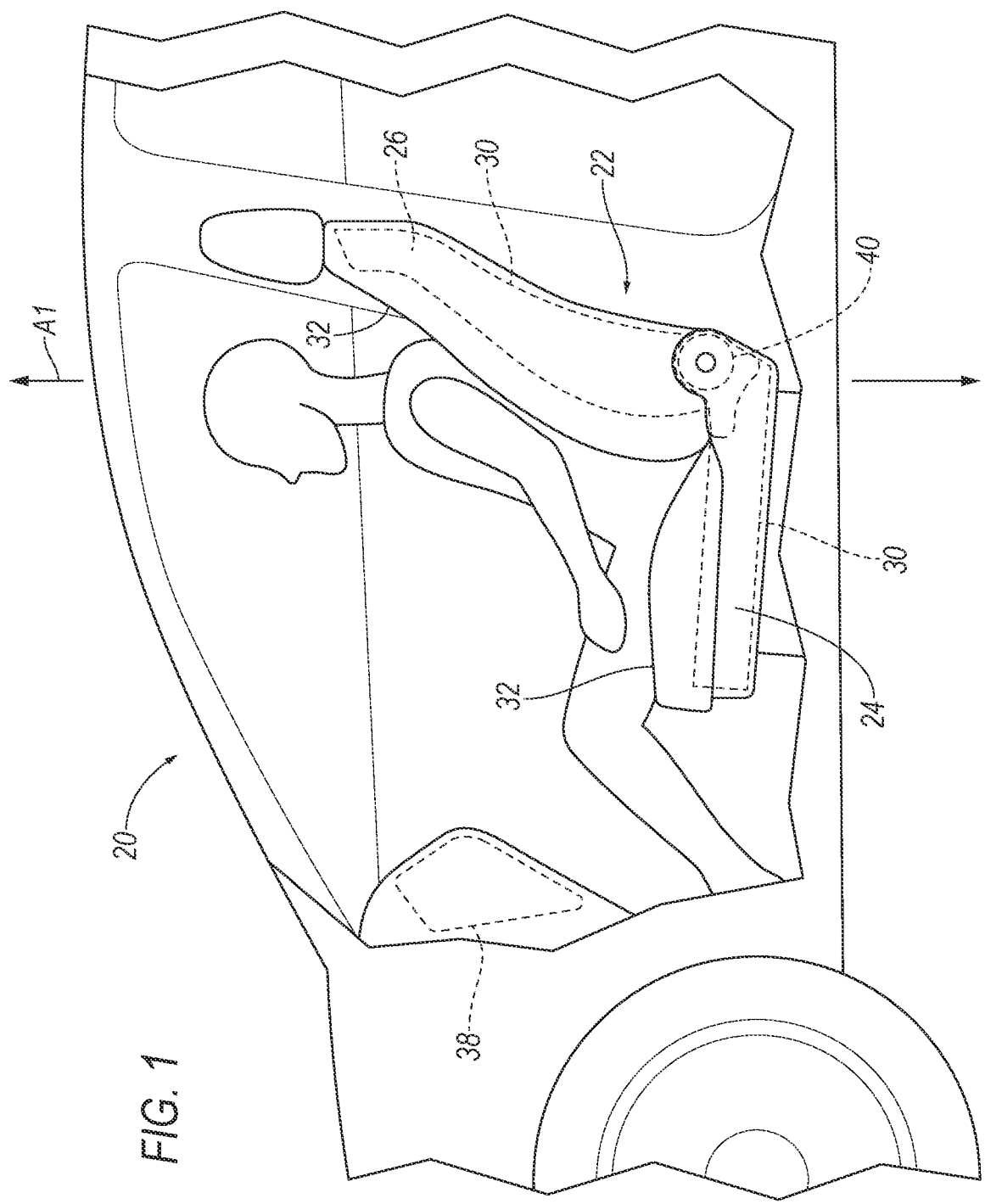
FIG. 1 is a side view of a portion of an example vehicle with a seat in an upright position.
Figure 2:
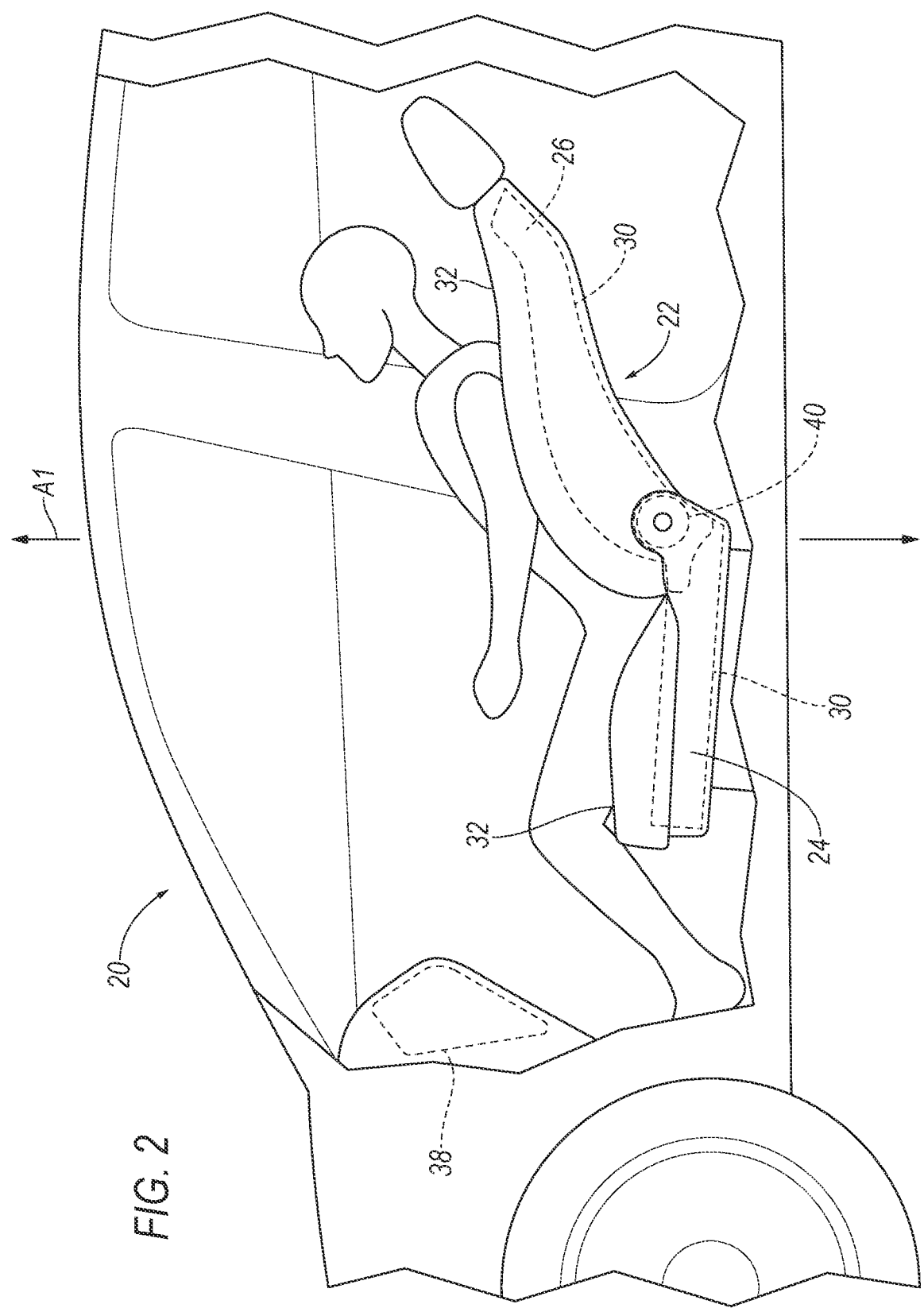
FIG. 2 is a side view of the portion of the example vehicle with the seat in a reclined position.

An assembly includes a seat bottom. The assembly includes a seatback supported by and movable relative to the seat bottom between an upright position and a reclined position. The assembly includes an actuator supported by the seat bottom and operatively coupled to the seatback to move the seatback from the reclined position to the upright position. The assembly includes a computer having a processor and a memory storing instructions executable by the processor to command to actuator to move the seatback to the upright position in response to detecting a pending vehicle impact.

The instructions may include instructions to command the actuator to move the seatback to the upright position in response to detecting the seatback in the reclined position and in response to detecting the pending vehicle impact.

The assembly may include a sensor in communication with the computer and configured to detect an angle between the seat bottom and the seatback, the instructions including instructions to determine the seatback is at the reclined position by comparing the detected angle with a threshold angle.

The assembly may include a seat recline mechanism connected to the seat bottom and the seatback, the seat recline mechanism movable between a locked position inhibiting movement of the seatback relative to the seat bottom and an unlocked position permitting movement of the seatback relative to the seat bottom.

The actuator may be operatively coupled to the seat recline mechanism to move to the seat recline mechanism to the unlocked position.

The actuator may be operatively coupled to the seat recline mechanism to move to the seat recline mechanism to the locked position, and the instructions may include instructions to command the actuator to move the seat recline mechanism to the locked position after detecting the seatback is in the upright position.

The seat recline mechanism may include a lever and movement of the lever in a first direction may move the seat recline mechanism to the unlocked position, the actuator may be operatively coupled to the lever to rotate the lever in the first direction.

The first direction may be downward.

The actuator may be linear and include a first end connected to the seat bottom and a second end connected to the lever.

The actuator may include a motor, a spool operatively coupled to the motor, and a cable connected to the spool and the lever.

The seat bottom may include a covering, and the actuator and the lever may be disposed within the seat bottom underneath the covering.

The covering may provide a class-A surface to the seat bottom.

The assembly may include an airbag supported forward of the seat and an inflator connected to the airbag, the instructions may include instructions to actuate the inflator to inflate the airbag.

The instructions may include instructions to move the seatback to the upright position before inflating the airbag.

The instructions may include instructions to move the seatback to the upright position in response to detecting the pending vehicle impact, and to inflate the airbag in response to detecting an actual vehicle impact.

With reference to FIGS. 1-6, a vehicle 20 with a seat 22 having a seat bottom 24 and a seatback 26 supported by the seat bottom 24 is shown. The seatback 26 is movable relative to the seat bottom 24 between an upright position and a reclined position. The vehicle 20 includes an actuator 34, 134 supported by the seat bottom 24. The actuator 34, 134 is operatively coupled to the seatback 26 to move the seatback 26 from the reclined position to the upright position. The vehicle 20 includes a computer 36 having a processor and a memory storing instructions executable by the processor to command the actuator 34, 134 to move the seatback 26 to the upright position in response to detecting a pending vehicle impact. Moving the seatback 26 to the upright position may control kinematics of an occupant of the seat 22, e.g., after the occupant has contacted an airbag 38 of the vehicle 20.

The vehicle 20 may be any suitable type of ground vehicle, e.g., a passenger or commercial automobile such as a sedan, a coupe, a truck, a sport utility, a crossover, a van, a minivan, a taxi, a bus, etc.

The seat 22 includes the seat bottom 24 and the seatback 26. The seatback 26 is supported by the seat bottom 24 and movable relative to the seat bottom 24 between the upright position, shown in FIGS. 1 and 6, and the reclined position, shown in FIG. 2. The seatback 26 in the upright position is generally vertical, e.g., within 30 degrees of parallel to a vehicle-vertical axis A1. The seatback 26 in the reclined position is at a shallower angle than in the reclined position. For example, the seatback 26 in the reclined position may be greater than 30 degrees from being parallel with the vehicle-vertical axis A1. The seatback 26 and the seat bottom 24 may be adjustable in multiple degrees of freedom. Specifically, the seatback 26 and the seat bottom 24 may themselves be adjustable, in other words, adjustable components within the seatback 26 and/or the seat bottom 24, and/or may be adjustable relative to each other.

The seat bottom 24 may include a first frame 28 and the seatback 26 may include a second frame 30. The first frame 28 and the second frame 30 may include tubes, beams, pans, etc. The first frame 28 and the second frame 30 may be of any suitable plastic material, e.g., carbon fiber reinforced plastic CFRP, glass fiber-reinforced semi-finished thermoplastic composite organosheet, etc. As another example, some or all components of the seatback 26 frame may be formed of a suitable metal, e.g., steel, aluminum, etc.

The seat bottom 24 and the seatback 26 may each include a covering 32. The covering 32 may include upholstery and padding. The upholstery may be cloth, leather, faux leather, or any other suitable material. The upholstery may be stitched in panels around the first frame 28 and the second frame 30. The padding may be between the covering 32 and the first frame 28 and the second frame 30 and may be foam or any other suitable material. The coverings 32 provide class-A surfaces to the seat bottom 24 and the seatback 26. A class-A surface is a finished surface exposed to view by a customer and free of unaesthetic blemishes and defects.

The seat 22 can include a seat recline mechanism 40 connected to the seat bottom 24 and the seatback 26. For example, the seat recline mechanism 40 may be fixed to the first frame 28 of the seat bottom 24 and the second frame 30 of the seatback 26. The seat recline mechanism 40 provides movement of the seatback 26 relative to the seat bottom 24. For example, the seat recline mechanism 40 may include a shaft about which the seatback 26 is rotatable. The seat recline mechanism 40 may include a spring biasing the seatback 26 at the reclined position toward the upright position. The spring may be, for example, a radial spring having one end fixed to the seatback 26 and an opposite end fixed to the seat bottom 24.

The seat recline mechanism 40 may be movable between a locked position inhibiting movement of the seatback 26 relative to the seat bottom 24 and an unlocked position permitting movement of the seatback 26 relative to the seat bottom 24. For example, the seat recline mechanism 40 may include a one or more gear teeth and a pawl that is movable into and out of engagement with the gear teeth and examples of such seat recline mechanisms are known in the art. When the pawl is disengaged from the teeth movement of the seatback 26 relative to the seat bottom 24 may be permitted. When the pawl is engaged with the teeth normal forces between the pawl and teeth may inhibit movement of the seatback 26 relative to the seat bottom 24.

Figure 4:
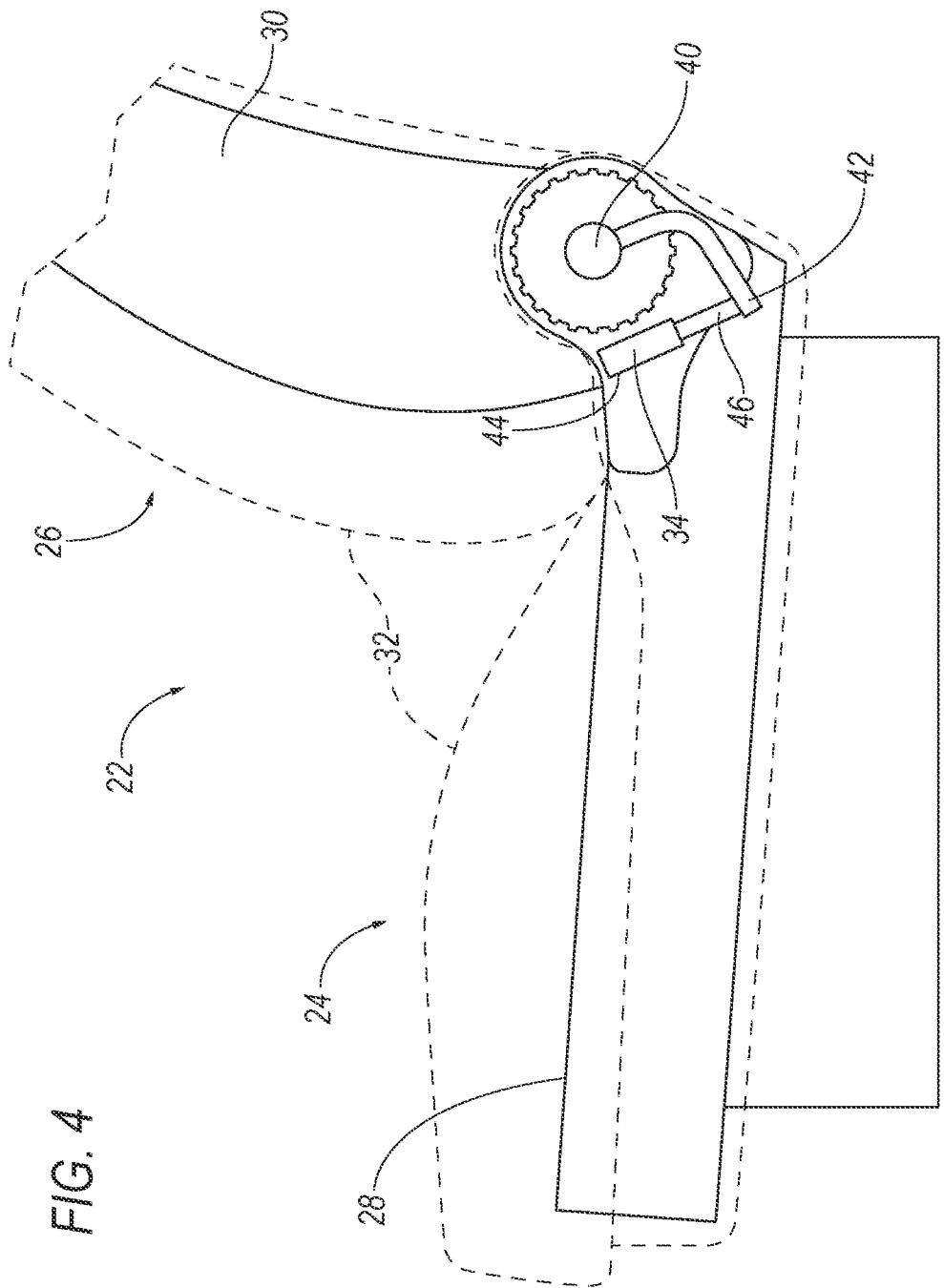
FIG. 4 is a side view of the seat with the actuator at an unlocked position
Figure 6:
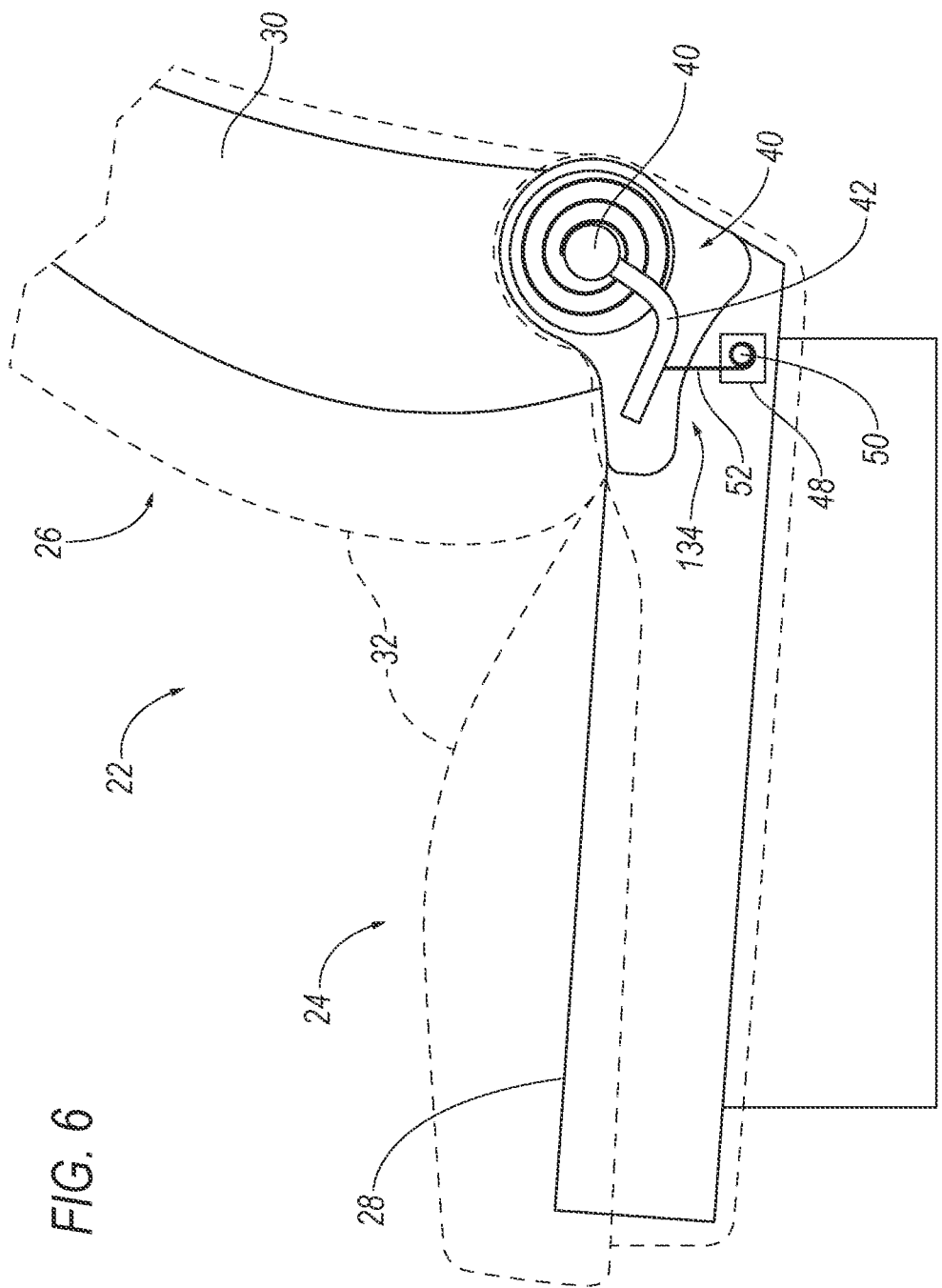
FIG. 6 is a side view of the seat with the another actuator at an unlocked position

The seat recline mechanism 40 can include a lever 42. Movement of the lever 42 in a first direction, e.g., downward toward a floor of the vehicle 20 and as shown in FIGS. 4 and 6, may move the seat recline mechanism 40 to the unlocked position. For example, the lever 42 may be connected to the pawl and movement of the lever 42 in the first direction may move the pawl out away from and of engagement with the teeth. Movement of the lever 42 in a second direction, e.g., opposite the first direction, may move the seat recline mechanism 40 to the locked position. For example, movement of the lever 42 in the second direction may move the pawl into engagement with the teeth. The seat recline mechanism 40 may include a spring urging the pawl toward the teeth. Such spring may, for example, be connected to the lever 42 and urge the lever 42 in the second direction. The lever 42 may be disposed within the seat bottom 24 underneath the covering 32, e.g., out of view from the occupant.

The actuator 34, 134 is operatively coupled to the seatback 26, e.g., via linkage, gears, or any other suitable structure, to move the seatback 26 from the reclined position to the upright position. For example, the actuator 34, 134 may be operatively coupled to the seat recline mechanism 40 to move to the seat recline mechanism 40 to the unlocked position. More specifically, the actuator 34, 134 may be operatively coupled to the lever 42 to rotate the lever 42 in the first direction. The actuator 34, 134 may be operatively coupled to the seat recline mechanism 40 to move to the seat recline mechanism 40 to the locked position. For example, the actuator 34, 134 may be operatively coupled to the lever 42 to rotate the lever 42 in the second direction. The actuator 34, 134 is supported by the seat bottom 24. For example, the actuator 34, 134 may be fixed to the first frame 28 of the seat bottom 24. The actuator 34, 134 may be disposed within the seat bottom 24 underneath the covering 32, e.g., out of view from the occupant. One example of the actuator 34 is shown in FIGS. 3 and 4 and another example of the actuator 134 is shown in FIGS. 5 and 6.

Figure 3:
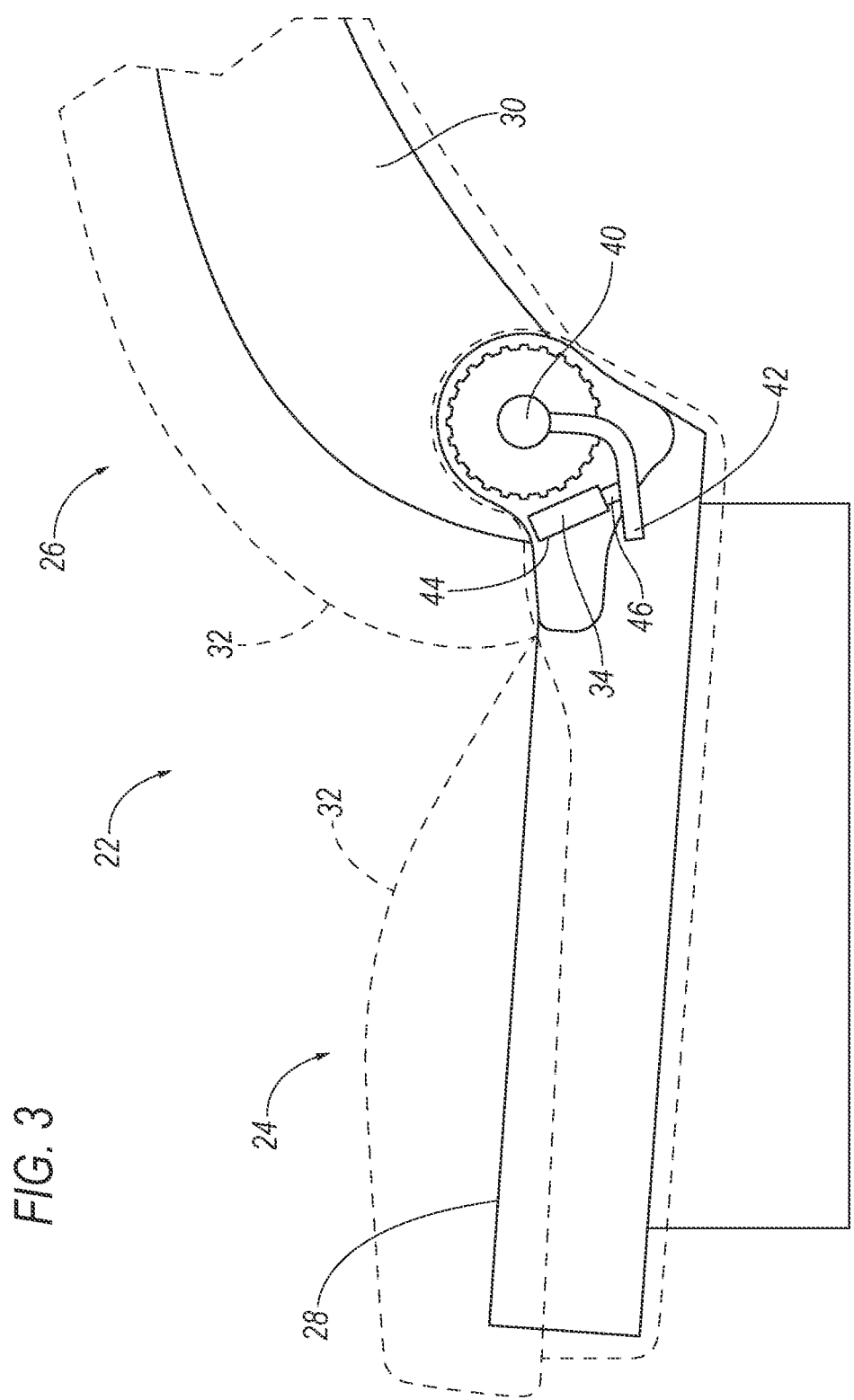
FIG. 3 is a side view of the seat with an actuator at a locked position.

With reference to FIGS. 3 and 4, the actuator 34 may be linear and actuate to change a length between a first end 44 and a second end 46 of the actuator 34. For example, the actuator 34 may be a linear servo, a screw type including a threaded shaft and hole, a hydraulic type including a piston and cylinder, a rack and pinion type, etc. The actuator 34 may actuate to change length in response to a command from the computer 36. The first end 44 of the actuator 34 may be connected, e.g., fixed, to the seat bottom 24. The second end 46 of the actuator 34 may be connected to the lever 42 of the seat recline mechanism 40. Increase or decrease of the length of the actuator 34 may move the lever 42 in the respective first direction or second direction to lock or unlock the seat recline mechanism 40.

Figure 5:
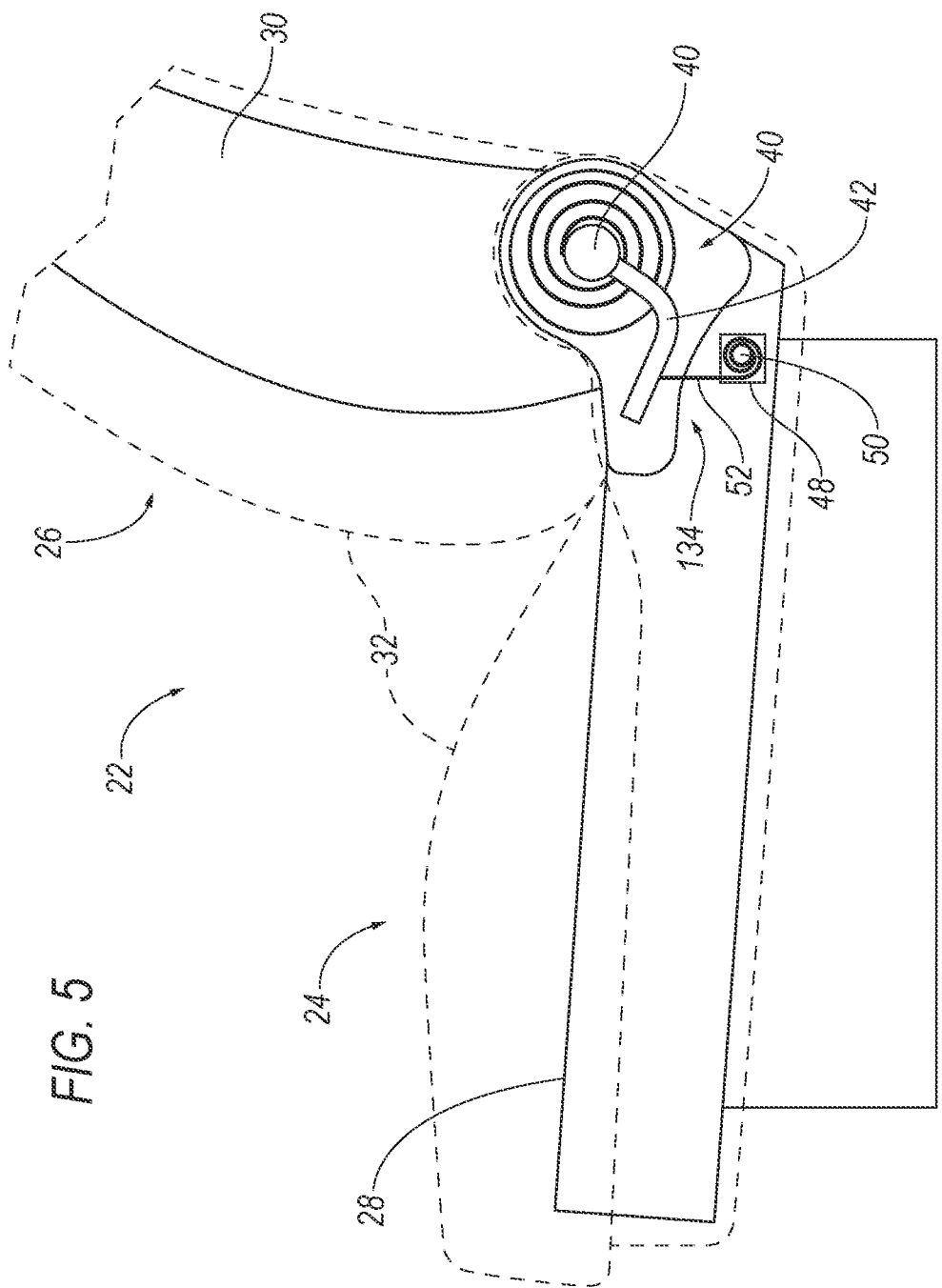
FIG. 5 is a side view of the seat with another actuator at a locked position.

With reference to FIGS. 5 and 6, the actuator 134 can include a motor 48 and a spool 50. The motor 48 may be fixed to the first frame 28 of the seat bottom 24. The spool 50 may be operatively coupled to the motor 48 to rotate the spool 50 concurrent with rotation of a driveshaft of the motor 48. For example, one or more gears, belts, pullies, etc., may connect the motor 48 to the spool 50 such that torque may be transferred therebetween. A cable 52 may be connected, e.g., wound around and/or fixed to, to the spool 50. The cable 52 may also be connected, e.g., fixed, to, the lever 42. Rotation of the spool 50 by the motor 48 may increase or decrease tension in the cable 52 and increase or decrease force applied to the lever 42. Rotation of the spool 50 in one direction may move the lever 42 in the first direction. Rotation of the spool 50 in an opposite second direction may decrease force applied to the lever 42, and force from the spring connected to the lever 42 may move the lever 42 in the second direction. The actuator 134 may include any other suitable electro-mechanical structure for moving the seatback 26 to the upright position.

Figure 7:
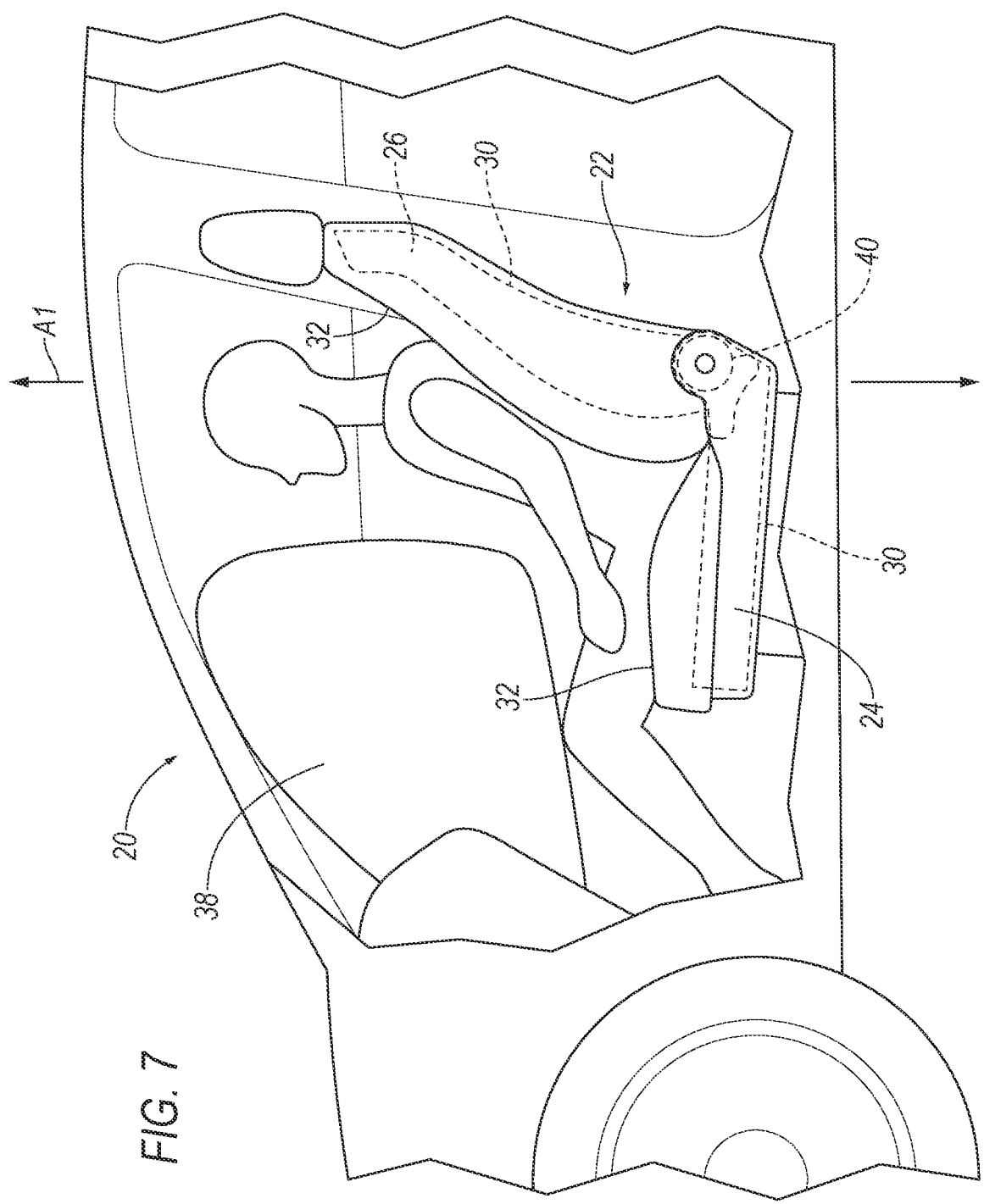
FIG. 7 is a side view of the portion of the example vehicle with the seat in the upright position and an airbag in an inflated position.

With reference to FIGS. 1 and 7, the airbag 38 is inflatable to an inflated position for controlling kinematics of the occupant. The airbag 38 in the inflated position is shown in FIG. 7. The airbag 38 may be fabric, e.g., a woven polymer. As an example, the airbag 38 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane. The airbag 38 may be supported forward of the seat 22, e.g., such that the airbag 38 in the inflated position is in front of the occupant of the seat 22. The airbag 38 may be, for example, fixed to a front instrument panel, bulkhead, or other suitable structure forward of the seat 22.

Figure 8:
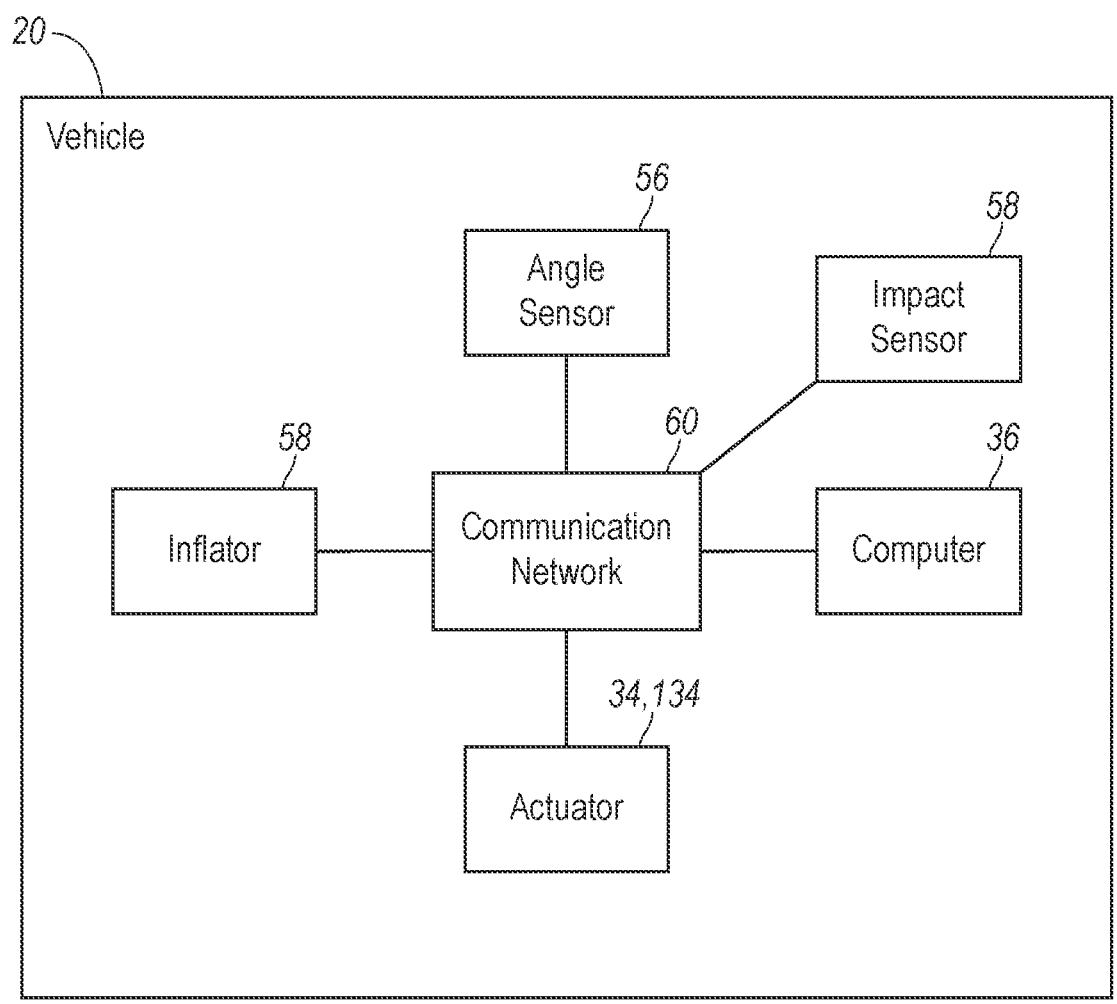
FIG. 8 is a block diagram including components of the example vehicle.

With reference to FIG. 8, the vehicle 20 may include an inflator 54 connected to the airbag 38 to inflate the airbag 38 to the inflated position upon actuation, e.g., in response to a command from the computer 36. The inflator 54 is in fluid communication with the airbag 38. The inflator 54 expands the airbag 38 with inflation medium, such as a gas, to move the airbag 38 from the uninflated position to the inflated position. The inflator 54 may be supported by any suitable component. The inflator 54 may be, for example, a pyrotechnic inflator that ignites a chemical reaction to generate the inflation medium, a stored gas inflator that releases e.g., by a pyrotechnic valve stored gas as the inflation medium, or a hybrid. The inflator 54 may be, for example, at least partially in an inflation chamber of the airbag 38 to deliver inflation medium directly to the inflation chamber or may be connected to the inflation chamber through fill tubes, diffusers, etc.

The vehicle 20 may include an angle sensor 56 configured to detect an angle α between the seat bottom 24 and the seatback 26. The angle sensor 56 may be, for example, a proximity sensor, a touch sensor, a hall effect sensor, a rotary encoder, a switch, or any other suitable sensor that can generate a signal indicate the angle between the seat bottom 24 and the seatback 26. The angle sensor 56 can be supported by the seat bottom 24, the seatback 26, or any suitable structure. The angle sensor 56 may be in communication with the computer 36. In other words, the computer 36 may receive a signal from the angle sensor 56 indicating angle between the seat bottom 24 and the seatback 26.

The vehicle 20 may include at least one impact sensor 58 for sensing impact of the vehicle 20. The impact sensor 58 is configured to detect an impact to the vehicle 20. The impact sensor 58 may be of any suitable type, for example, post contact sensors such as accelerometers, pressure sensors, and contact switches. The impact sensor 58 may be configured to sense impact prior to impact, i.e., pre impact sensing that detects a pending impact. Example pre impact sensors include radar, LIDAR, and vision sensing systems. The vision sensing systems may include one or more cameras, CCD image sensors, CMOS image sensors, etc. The impact sensor 58 may be located at numerous points in or on the vehicle 20.

As set forth above, the vehicle 20 includes the computer 36 having a processor and a memory storing instructions executable by the processor. Specifically, the memory stores instructions executable by the processor, i.e., the computer 36 is programmed to, perform the process 900 described below. The computer 36 may be, for example, a restraints control module. Use of "in response to," "based on," and "upon determining" with reference to the computer and the process 900 indicates a causal relationship, not merely a temporal relationship.

The computer 36 includes a processor and a memory. The memory includes one or more forms of computer 36 readable media, and stores instructions executable by the computer 36 for performing various operations, including as disclosed herein. For example, the computer 36 can be a generic computer 36 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, a computer 36 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 36. The memory can be of any type, e.g., hard disk drives, solid state drives, servers, or any volatile or non-volatile media. The memory can store the collected data sent from the sensors. The memory can be a separate device from the computer 36, and the computer 36 can retrieve information stored by the memory via a network in the vehicle 20, e.g., over a CAN bus, a wireless network, etc. Alternatively or additionally, the memory can be part of the computer 36, e.g., as a memory of the computer 36. The computer 36 may be in communication with the actuator 34, 134, the inflator 54, the angle sensor 56, and the impact sensor 58 may be in communication with the computer 36, or other component of the vehicle 20, e.g., via a communication network 60 that can include a bus in the vehicle 20 such as a controller area network CAN or the like, and/or other wired and/or wireless mechanisms. Alternatively or additionally, in cases where the computer 36 actually comprises a plurality of devices, the vehicle 20 communication network 60 may be used for communications between devices represented as the computer 36 in this disclosure. Further, as mentioned below, various controllers and/or sensors may provide data to the computer 36 via the vehicle 20 communication network 60.

The computer 36 is programmed to, i.e., the memory stores instructions executable by the processor to, detect the seatback 26 at the upright position and the reclined position. The computer 36 may detect the seatback 26 is at the upright position and the reclined position based on, for example, information from the angle sensor 56 indicating an angle of the seatback 26. For example, the computer 36 may determine the seatback 26 is at the reclined position or the upright position by comparing the detected angle indicated in the information from the angle sensor 56 with a threshold angle. The computer 36 may determine the seatback 26 is at the inclined position when the detected angle between the seat bottom 24 and the seatback 26 is less than 110 degrees. The computer 36 may determine the seatback 26 is at the reclined position when the detected angle between the seat bottom 24 and the seatback 26 is greater than 110 degrees.

The computer 36 is programmed to detect an impact to the vehicle 20, e.g., a pending impact (an impact that is highly imminent but has not yet occurred) and an actual impact (an impact that has occurred). The computer 36 may detect the pending impact and the actual impact based on information from the impact sensors 58, e.g., from post contact sensors and pre impact sensing. The computer 36 may detect a pending impact based on data from a camera, LIDAR sensor, etc., e.g., indicating that an object is approaching the vehicle 20 at a speed above a threshold rate. The computer 36 may use other known methodologies to detect a pending impact, e.g., based on data from the impact sensors 58. The computer 36 may detect an actual impact based on data from an accelerometer, a force transducer, etc., e.g., indicating that an acceleration of the vehicle 20 or a force applied to the vehicle 20 is above a threshold. The computer 36 may use other known methodologies to detect an actual impact, e.g., based on data from the impact sensors 58

The computer 36 may be programmed to command the actuator 34, 134 to move the seatback 26 to the upright position. For example, the computer 36 may transmit a command via the communication network 60 to the actuator 34, 134. The command may instruct the actuator 34, 134 to move the lever 42 downward to unlock the seat recline mechanism 40. The computer 36 may command the actuator 34, 134 to move the seatback 26 to the upright position based on detection of the seatback 26 in the reclined position in response to detecting a pending vehicle impact.

The computer 36 may be programmed to command the actuator 34, 134 to move the seat recline mechanism 40 to the locked position. For example, the computer 36 may transmit a command via the communication network 60 to the actuator 34, 134. The command may instruct the actuator 34, 134 to move the lever 42 upward to lock the seat recline mechanism 40. The computer 36 may command the actuator 34, 134 to move the seat recline mechanism 40 to the locked position after commanding the actuator 34, 134 to move the seatback 26 to the upright position and subsequently detecting that the seatback 26 is in the upright position.

The computer 36 may be programmed to actuate the inflator 54 to inflate the airbag 38. For example, the computer 36 may activate the inflators 54 by providing an impulse to a pyrotechnic charge of the inflators 54. The computer 36 may inflate the airbag 38 in response to detecting an actual impact and not merely a pending impact.

Figure 9:
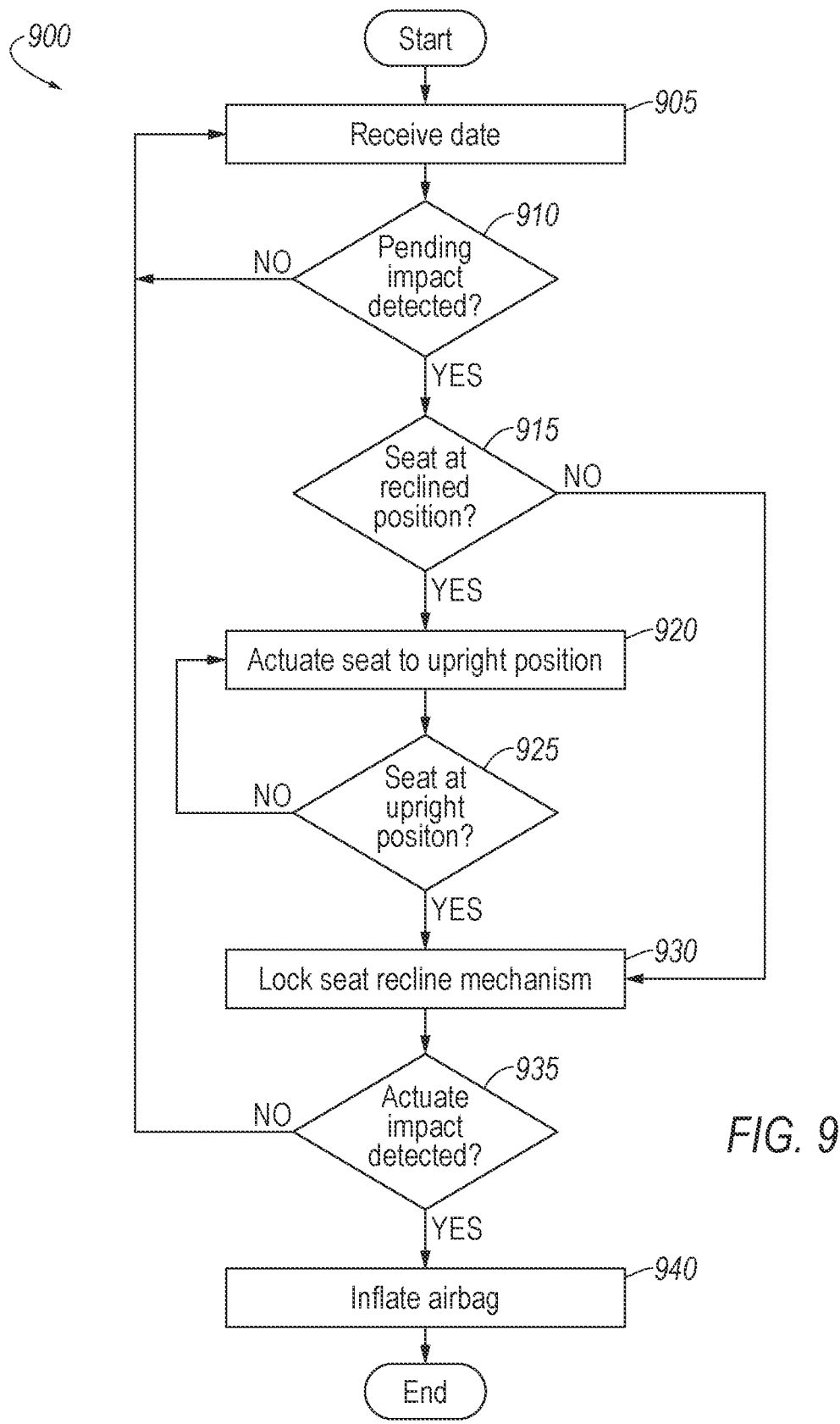
FIG. 9 is a flow chart showing a process for controlling the actuator and the airbag.

FIG. 9 is a process flow diagram illustrating an exemplary process 900 for controlling the position of the seatback 26. The process 900 may be performed by the computer 36. The process 900 begins in a block 905, in which the computer 36 collects data, e.g., received from the angle sensor 54, the impact sensor 58, etc., e.g., via the communication network 60. The computer 36 may continue to receive data throughout the process 900. Throughout the process 900 in the present context means substantially continuously or at time intervals, e.g., every 100 milliseconds. The computer 36 may store such data.

At a step 910 the computer 36 determines whether a pending impact has been detected, e.g., based on information from the impact sensors 58. In response to determine a pending impact has been detected the computer 36 moves to a block 915. In response to determine a pending impact has not been detected the computer 36 returns to the block 905. Alternately, the process 900 may end.

At the step 915 the computer 36 determines whether the seatback 26 is in the reclined position, e.g., based on information from the angle sensor 56. In response to determining the seatback 26 is in the reclined position the computer 36 moves to a block 920. In response to determining the seatback 26 is not in the reclined position, e.g., that the seatback 26 is in the upright position, the computer 36 moves to a block 930.

At the block 920 the computer 36 commands the actuator 34, 134 to move the seatback 26 to the upright position, e.g., by commanding the actuator 34, 134 to change length and unlock the seat recline mechanism 40. After the block 920, the computer 36 moves to a block 925.

At the block 925 the computer 36 determines whether the seatback 26 is in the upright position, e.g., based on information from the angle sensor 56. In response to determining the seatback 26 is in the upright position the computer 36 moves to the block 930. In response to determining the seatback 26 is not in the upright position, e.g., that the seatback 26 is in the reclined position, the computer 36 moves may return to the block 920 and again command the actuator 34, 134 to move the seat 22 to the upright position.

At the block 930 the computer 36 commands the actuator 34, 134 to lock the seat recline mechanism 40, e.g., by changing length of the actuator 34, 134 and moving the lever 42 as described herein. After the block 930, the computer 36 moves to a block 935.

At the block 935 the computer 36 determines whether an actual impact has been detected, e.g., based on information from the impact sensors 58. In response to determining an actual impact has been detected the computer 36 moves to a block 940. In response to determining an actual impact has not been detected the computer 36 returns to the block 905. Alternately, the process 900 may end.

At the block 940 the computer 36 inflates the airbag 38, e.g., by sending a command to the inflators 54. The airbag 38 in the inflated position and the seat 22 in the upright position with the seat recline mechanism 40 locked may control kinematics of the occupant in multiple directions. For example, the airbag 38 may control forward movement of the occupant and the seatback 26 in the upright position may control rearward movement of the occupant, e.g., after the occupant rebounds from the airbag 38. After the block 940 the process 900 ends.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer 36 readable medium, such as a storage medium, a random access memory, etc. A computer 36 readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer 36-readable media include, for example, RAM, a PROM, an EPROM, a FLASH-EEPROM, any other memory chip or cartridge, or any other medium from which a computer can read.

The adjectives first and second are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
   a seat bottom;
   a seatback supported by and movable relative to the seat bottom between an upright position and a reclined position;
   an actuator supported by the seat bottom and operatively coupled to the seatback to move the seatback from the reclined position to the upright position;
   a seat recline mechanism connected to the seat bottom and the seatback, the seat recline mechanism being movable between a locked position inhibiting movement of the seatback relative to the seat bottom and an unlocked position permitting movement of the seatback relative to the seat bottom;
   the seat recline mechanism including a spring biasing the seatback at the reclined position toward the upright position;
   the actuator being operatively coupled to the seat recline mechanism to move the seat recline mechanism to the unlocked position; and
   a computer having a processor and a memory storing instructions executable by the processor to command the actuator to move the seat recline mechanism to the unlocked position to move the seatback to the upright position in response to detecting a pending vehicle impact and in response to detecting the seatback in the reclined position.

2. The assembly of claim 1, further comprising a sensor in communication with the computer and configured to detect an angle between the seat bottom and the seatback, the instructions including instructions to determine the seatback is at the reclined position by comparing the detected angle with a threshold angle.

3. The assembly of claim 1, wherein the actuator is operatively coupled to the seat recline mechanism to move the seat recline mechanism to the locked position, and wherein the instructions include instructions to command the actuator to move the seat recline mechanism to the locked position after detecting the seatback is in the upright position.

4. The assembly of claim 1, wherein the seat recline mechanism includes a lever and movement of the lever in a first direction moves the seat recline mechanism to the unlocked position, the actuator being operatively coupled to the lever to rotate the lever in the first direction.

5. The assembly of claim 4, wherein the first direction is downward.

6. The assembly of claim 4, wherein the actuator is linear and includes a first end connected to the seat bottom and a second end connected to the lever.

7. The assembly of claim 4, wherein the actuator includes a motor, a spool operatively coupled to the motor, and a cable connected to the spool and the lever.

8. The assembly of claim 4, wherein the seat bottom includes a covering, and the actuator and the lever are disposed within the seat bottom underneath the covering.

9. The assembly of claim 8, wherein the covering provides a class-A surface to the seat bottom.

10. The assembly of claim 1, further comprising an airbag supported forward of the seat and an inflator connected to the airbag, the instructions including instructions to actuate the inflator to inflate the airbag.

11. The assembly of claim 10, wherein the instructions include instructions to move the seatback to the upright position before inflating the airbag.

12. The assembly of claim 10, wherein the instructions include instructions to move the seatback to the upright position in response to detecting the pending vehicle impact, and to inflate the airbag in response to detecting an actual vehicle impact.

13. The assembly of claim 1, wherein the seat recline mechanism includes one or more gear teeth and a pawl that is moveable into engagement with the gear teeth in the locked position and out of engagement with the gear teeth in the unlocked position to allow the spring to move the seatback toward the upright position.

14. An assembly, comprising:
    a seat bottom;
    a seatback supported by and movable relative to the seat bottom between an upright position and a reclined position;
    an actuator supported by the seat bottom and operatively coupled to the seatback to move the seatback from the reclined position to the upright position;
    a seat recline mechanism connected to the seat bottom and the seatback, the seat recline mechanism being movable between a locked position inhibiting movement of the seatback relative to the seat bottom and an unlocked position permitting movement of the seatback relative to the seat bottom;
    the actuator operatively coupled to the seat recline mechanism to move the seat recline mechanism to the unlocked position;
    the seat recline mechanism including a lever and movement of the lever in a first direction moves the seat recline mechanism to the unlocked position, the actuator being operatively coupled to the lever to rotate the lever in the first direction; and
    a computer having a processor and a memory storing instructions executable by the processor to command the actuator to move the seat recline mechanism to the unlocked position to move the seatback to the upright position in response to detecting a pending vehicle impact and in response to detecting the seatback in the reclined position.

15. The assembly of claim 14, wherein the first direction is downward.

16. The assembly of claim 14, wherein the actuator is linear and includes a first end connected to the seat bottom and a second end connected to the lever.

17. The assembly of claim 14, wherein the actuator includes a motor, a spool operatively coupled to the motor, and a cable connected to the spool and the lever.

18. The assembly of claim 14, wherein the seat bottom includes a covering, and the actuator and the lever are disposed within the seat bottom underneath the covering.

19. The assembly of claim 18, wherein the covering provides a class-A surface to the seat bottom.

20. The assembly of claim 14, further comprising a sensor in communication with the computer and configured to detect an angle between the seat bottom and the seatback, the instructions including instructions to determine the seatback is at the reclined position by comparing the detected angle with a threshold angle.

\* \* \* \* \*